(12) United States Patent
Liu et al.

(10) Patent No.: US 8,446,599 B2
(45) Date of Patent: May 21, 2013

(54) METHODS AND STRUCTURES FOR CONVERTING JDF INFORMATION INTO COMMANDS FOR A PRINTER

(75) Inventors: Yue Liu, San Jose, CA (US); Hitoshi Sekine, Los Altos, CA (US)

(73) Assignee: Ricoh Company, Ltd, Tokyo (JP)

( * ) Notice: Subject to any disclaimer, the term of this patent is extended or adjusted under 35 U.S.C. 154(b) by 1312 days.

(21) Appl. No.: 12/118,164

(22) Filed: May 9, 2008

(65) Prior Publication Data

US 2009/0279124 A1    Nov. 12, 2009

(51) Int. Cl.
 *G06F 3/12*  (2006.01)
(52) U.S. Cl.
 USPC ............................ 358/1.13; 358/1.9; 358/3.23
(58) Field of Classification Search
 USPC .................................................. 358/1.1–3.23
 See application file for complete search history.

(56) References Cited

U.S. PATENT DOCUMENTS

| 5,923,013 A * | 7/1999 | Suzuki et al. ................. 235/375 |
| 2005/0212904 A1 | 9/2005 | Uejo |
| 2005/0213116 A1 | 9/2005 | Uejo |
| 2005/0213132 A1 * | 9/2005 | Uejo ........................... 358/1.13 |
| 2006/0232818 A1 * | 10/2006 | Hino et al. .................. 358/1.15 |

* cited by examiner

*Primary Examiner* — Benny Q Tieu
*Assistant Examiner* — Marcellus Augustin
(74) *Attorney, Agent, or Firm* — Duft Bornsen & Fettig, LLP

(57) ABSTRACT

Methods and structures for processing JDF elements for a printing system by translating JDF elements into corresponding command language strings for output to a printer. The command language strings are associated with a priority value. The generated command language strings are output in an order based on the associated priority values so that the intended semantic and scope of the JDF elements may be maintained in the generated command language strings. The translation may use one or more translation tables to match a JDF element path name for a received JDF element with one or more entries in one or more translation tables. The matching table entries may specify a corresponding command language string and a priority value to be output to a printer. The generated command language strings and associated priority values may be stored in a memory structure to permit output in the desired order.

15 Claims, 7 Drawing Sheets

| Skip Table 300 |
|---|
| JDF Element Path Name 400 |
| ⋮ |
| JDF Element Path Name 402 |

450 → (top row)
452 → (bottom row)

*FIG. 4*

| JDF -> PJL Table 302 | | |
|---|---|---|
| JDF Element Path Name 500 | PJL String 510 | Priority 520 |
| ⋮ | ⋮ | ⋮ |
| JDF Element Path Name 502 | PJL String 512 | Priority 522 |

550 → (top row)
552 → (bottom row)

*FIG. 5*

| JDF -> PDL Table 304 | | |
|---|---|---|
| JDF Element Path Name 600 | PJL String 610 | Priority 620 |
| ⋮ | ⋮ | ⋮ |
| JDF Element Path Name 602 | PJL String 612 | Priority 622 |

650 → (top row)
652 → (bottom row)

*FIG. 6*

METHODS AND STRUCTURES FOR CONVERTING JDF INFORMATION INTO COMMANDS FOR A PRINTER

BACKGROUND

1. Field of the Invention

The invention relates generally to processing of Job Definition Format (JDF) information and more specifically relates to methods and structures for converting JDF information into command language directives for a printer.

2. Discussion of Related Art

In many printing environments, including print shops (large and small), production printing, and even smaller workgroup environments, it is generally known to create JDF information describing the processing to print a particular print job. JDF is a widely adopted standard specification for providing information (printing parameters) relating to processing of a print job. The JDF information is typically contained in an object/file referred to as a "job ticket" and is associated with the print data for the print job by entries in the job ticket. A JDF job ticket includes any number of JDF elements that specify printing parameters associated with the printing of a particular job. Exemplary of such printing parameters are: one or more resource locators identifying content for the material to be printed, rendering parameters indicating options for rendering various types of objects associated with a print job, layout options indicating, for example, n-up, duplex, and other available print options, etc.

The JDF standards are published by CIP4 (a trade organization) and are readily available at www.cip4.org. In general, JDF elements are organized as a hierarchical tree such that various parameters are grouped into associated, logical branches of the tree of possible parameters and options. The tree has a common root and branches are associated with certain enumerated groupings of related parameters that may be specified by a user/application in creating a job ticket. Some present-day printing systems include a print server or other print related computing devices that receive a JDF job ticket and process the JDF elements specified therein to directly control aspects of the print job.

The JDF specification defines a large number of printing parameters distributed through the logical branches of the JDF hierarchy. Some printing parameters may be specified in multiple branches of the JDF hierarchy. In some cases, a printing parameter may be equivalently specified using any of the multiple, duplicated JDF elements of the hierarchy. They may be duplicated because the parameters may be logically grouped in different portions of the tree hierarchy based on historical evolution of the JDF standards and also based on the application of JDF standards to legacy printing environments such as offset press shops as well as more recent digital press applications.

Some printing systems (e.g., older, legacy systems) provide no capability for directly processing JDF job ticket information. For example, a large number of existing printing systems support one or more Page Description Languages (PDLs) such as Postscript, PCL, etc., but provide no direct support for processing of JDF job tickets. Some of those existing printing systems support some job control features such as the Printer Job Language (PJL) originally specified by Hewlett Packard. For such printing systems devoid of direct support for processing of a JDF job ticket, the JDF must be translated into appropriate commands for a particular printer by a host based application (i.e., a print server JDF job ticket processor). However, given the variations of semantic meaning of JDF elements as defined for various models of printer by various vendors, it is an ongoing challenge to effectively process the JDF information contained in the job ticket. A custom coded translation process may be difficult to alter to adapt to the needs of a new printer or the definitions of a new vendor.

SUMMARY

The present invention solves the above and other problems, thereby advancing the state of the useful arts, by providing methods and associated structure for effectively and flexibly translating JDF job ticket information into corresponding command language strings that may be processed directly by a printing system devoid of support for direct processing of JDF elements. More specifically, features and aspects hereof provide for translation of the hierarchical structure of provided JDF elements (e.g., in a JDF job ticket) into corresponding command language strings such as PJL and/or PDL sequences. A priority value is associated with the translation process such that where the printing parameter may be specified in multiple portions of the JDF hierarchy, the translated command language strings will be generated so as to use the JDF value from the desired location of the JDF hierarchical structure. A table driven translation process in one embodiment of the invention improves flexibility in the JDF to command language translation processing. Table entries may be coded as text strings and thus may be easily altered to add a new parameter definition for a new printer and/or vendor or to modify an existing translation definition. Further, use of the priority field in the translation process allows for flexibility in prioritizing a parameter definition in one area of the JDF flexibility to override another definition of the same parameter duplicated in another area of the JDF hierarchy.

One aspect hereof provides a method for translating Job Definition Format (JDF) elements into a command language of a printer. The method includes receiving JDF elements wherein each JDF element is identified by a JDF element path name. The method further includes translating the received JDF elements to generate command language strings wherein each command language string is associated with a corresponding priority value and outputting the command language strings in an order based on the priority value associated with each command language string.

Another aspect hereof provides a computer system for processing JDF elements associated with printing of print data. The computer system includes a host interface adapted to couple the system to a host system and adapted to receive JDF elements from an attached host system each JDF element identified by a JDF element path name and a printer interface adapted to couple the system to a printer and adapted to output command language strings to an attached printer. The computer system also includes a JDF translator coupled to the host interface and coupled to the printer interface and operable to process received JDF elements to generate command language strings and is operable to associate a priority value with each command language string and is operable to output the generated command language strings through the printer interface to an attached printer in an order based on the priority values associated with each generated command language string.

The invention may include other exemplary embodiments described below.

BRIEF DESCRIPTION OF THE DRAWINGS

The same reference number represents the same element or same type of element on all drawings.

FIG. 4 is a block diagram providing exemplary additional details of features of the skip table of FIG. 3.

FIG. 5 is a block diagram providing exemplary additional details of features of the JDF to PJL translation table of FIG. 3.

FIG. 6 is a block diagram providing exemplary additional details of features of the JDF to PDL translation table of FIG. 3.

DETAILED DESCRIPTION OF THE DRAWINGS

FIGS. 1-12 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
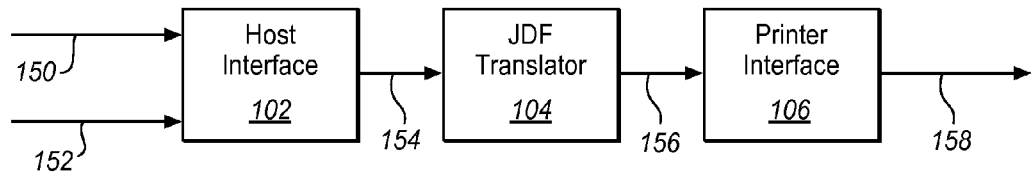
FIG. 1 is a block diagram of an exemplary system embodying features and aspects hereof to translate JDF into corresponding command language strings for a printing system.

FIG. 1 is a block diagram of a system 100 in which JDF translation features and aspects hereof may be embodied. System 100 may be any suitable computing system including, for example, a workstation, a personal computer, or any other suitable server or client computing node. System 100 may include a host interface 102 for communicatively coupling to one or more host systems (not shown). Host systems may transfer a JDF job ticket defining a job to be printed via path 150 to host interface 102. Associated print data may be forwarded from host systems to host interface 102 via path 152. Paths 150 and 152 (and thus host interface 102) may comprise any suitable communication media and/or protocols for exchanging information between system 100 and one or more attached host systems. In one exemplary embodiment, system 100 may be a server compute node providing print services and host interface 102 may provide coupling to one or more host systems through Ethernet or other the well-known, commercially available networking media and protocols represented as paths 150 and 152.

Those of ordinary skill will recognize numerous embodiments for implementing JDF translation features hereof. In one exemplary embodiment, JDF translator 104 may be integrated in a server computing node coupled between a host system and a printer. The server performs the desired translations and forwards the PJL/PDL output to the printing device. In another exemplary embodiment, JDF translator 104 may be integrated within the printing device per se—either coupled to the PJL/PDL processing controller or integrated therewith. In yet another exemplary embodiment, JDF translator 104 may be integrated within the host system on which printing applications are operable. These and other configurations for implementing JDF translator 104 and for integrating it with other compute devices in a printing environment will be readily apparent to those of ordinary skill in the art. Thus FIG. 1 is meant to broadly express any and all such exemplary embodiments of JDF translator 104 regardless of where it is embodied and how it is integrated with other computing nodes or print system components.

JDF job ticket information and any associated print data received through host interface 102 may then be applied via path 154 to JDF translator 104. Communication path 154 may be any suitable communication medium and protocol including, for example, inter-process communications where host interface 102 and JDF translator 104 are operable within a common compute node. JDF translator 104 is generally operable to translate the JDF elements in the received JDF job ticket into corresponding command language strings such as PJL or PDL command strings. In addition, PDL command strings generated by translation of the JDF elements may be merged and/or appended to portions of the print data received from host interface 102 via path 154. JDF translator 104 then applies the generated command language strings via path 156 to printer interface 106. Communication path 156 may likewise be any suitable communication medium and protocol including, for example, inter-process communications where JDF translator 104 and printer interface 106 are operable within a common compute node. Printer interface 106 may then transfer the generated command language strings to a printing system coupled thereto via path 158. Communication path 158 may be any suitable communication medium and/or protocol for exchanging information between system 100 and an attached printing system (not shown). For example, communication path 158 may comprise an Ethernet network communication interface coupling compute node 100 to an attached printing system. In the alternative, JDF translator 104 may simply store/spool the generated command language strings integrated or merged with any associated print data such that the stored information may be utilized later for application to an appropriate printing system.

In general, JDF translator 104 is operable to translate each received JDF element into one or more corresponding command language strings including, for example, PJL and/or PDL command language strings. As noted above, the hierarchical nature of the JDF information and the flexibility in semantic definition of the printing parameters that allows vendors to define various print parameters, a priority value may be associated with translation of each JDF element into a corresponding command language string. The generated command language strings may then be applied in an order based on this priority value associated with each generated command language string to assure that any duplicated JDF elements appearing in multiple entries of the JDF job ticket will be generated in the command language strings in a proper sequence.

Figure 2:
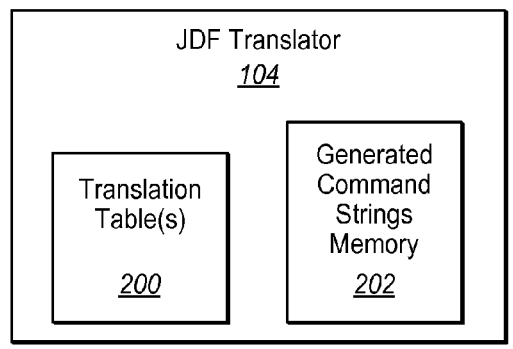
FIG. 2 is a block diagram providing exemplary additional details of features of the JDF translator of FIG. 1.

FIG. 2 is a block diagram providing exemplary additional details of an embodiment of JDF translator 104. In particular, JDF translator 104 may utilize translation tables 200 and a generated command string memory 202 for processing JDF translations. Translation tables 200 include one or more tables in which JDF translator 104 attempts to locate each received JDF element. Each received JDF element is identified by a JDF element path name representing its position in accordance with the specified hierarchy of the JDF standard. As well known to those of ordinary skill in the art, the path name for a JDF element may be specified as an absolute path name from the root of the JDF hierarchy (i.e., "/JDF/ . . . ") as defined by the JDF standard or may be specified with only a partial or relative path name that may applied to multiple similar parameter values specified in multiple locations of the JDF hierarchy (i.e., "//DigitalPrintingParams/Sides"). Thus each entry in the translation tables 200 includes a command language string used by JDF translator 104 to match the JDF element path name of a received JDF element. The JDF element path name in each table entry used for matching may also be specified as an absolute (root-based) JDF path or a relative path. In addition, the matching name field may be specified as a regular expression string for matching against received JDF element path name strings. Additional fields of each entry in the translation tables 200 may indicate a corresponding command language string as well as an associated priority value to be used to represent the JDF element in the command language of the printer.

To assure that the generated command language strings are applied to the printer interface 106 (or otherwise merged with print data and spooled or stored), JDF translator 104 stores each generated command language string in association with the priority value in the generated command strings memory 202. When the last JDF element is received and processed, generated strings in memory 202 may then be appropriately appended to or merged with print data to be applied to an attached printing system (or may be stored or spooled in a suitable persistent memory for later printing).

Figure 3:
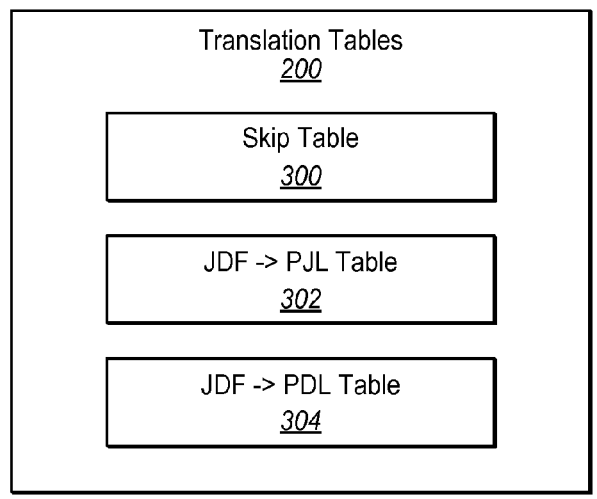
FIG. 3 is a block diagram providing exemplary additional details of features of the translation tables of FIG. 2.

FIG. 3 is a block diagram providing exemplary additional details of an embodiment of translation tables 200 noted above in FIG. 2. Translation tables 200 may include an optional skip table 300, a JDF to PJL table 302, and a JDF to PDL table 304. For each received JDF element (identified by a JDF element path name), the JDF translator 104 may attempt to locate the JDF element path name in skip table 300. Since a large number of JDF elements are not supported by many printing systems, skip table 300 may provide a fast, indexed lookup table to rapidly determine that a received JDF element does not correspond to any command language string for a particular printer. If the JDF element path name for a received element is not found in skip table 300, translator 104 may then determine whether a PJL command string may be defined for this received JDF element path name by locating one or more matching entries in table 302. In like manner, translator 104 may attempt to locate one or more matching entries in the JDF to PDL table 304 to determine if a PDL command language string may be defined for this received JDF element. For each matching entry in table 302 and/or table 304, the command string in each matching entry may be extracted and stored along with the associated priority value in each matching entry such that generated command strings may be appended and/or merged into the print data for the job to be printed. For example, strings extracted from matching entries in the JDF to PJL translation table 302 may be merged with PJL header data that may be embedded in the received print data for the print job. Similarly, commands strings extracted from the JDF to PDL translation table 304 may be added to or merged with appropriate portions of the PDL command strings in the received print data for the print job. In particular, PJL command strings may be added to a PJL header portion of the print data of the print job in an order determined from lowest priority to highest priority such that the higher priority valued command language string will be the last such command string for the corresponding JDF element to appear in the PJL header. Where matching entries are found in the JDF to PDL translation table 304, the PDL command strings may be either added to or merged with other related PDL command strings in the print data of the print job in accordance with the dictates of the particular PDL. As known to those of ordinary skill in the art, Postscript command strings are preferably added to or merged with command strings between a begin feature ("%%BeginFeature") comment header and an end feature ("%%EndFeature") comment header in the print data stream. Still further as known to those of ordinary skill in the art, PCL command strings are preferably added to or merged with other commands strings after begin session or begin page sequences of PCL operators.

FIGS. 4, 5, and 6 provide exemplary additional details of the structure of skip table 300, JDF to PJL translation table 302, and JDF to PDL translation table 304, respectively. As generally noted above with respect to FIG. 3, FIG. 4 shows exemplary structure of the skip table 300 having a plurality of entries 450 through 452. Each entry includes a corresponding JDF element path name 400 through 402, respectively. The purpose of the skip table as noted above is generally to provide a rapid index to the potentially large volume of JDF elements that will have no supported, direct translation to corresponding command language strings.

FIG. 5 shows an exemplary structure for a JDF to PJL table 302 as discussed above in FIG. 3. Each entry 550 through 552 may include a JDF element path name 500 through 502, respectively, a PJL command language string 510 through 512, respectively, and a priority value 520 through 522, respectively.

In like manner, FIG. 6 shows an exemplary JDF to PDL translation table 304 having multiple entries 650 through 652 each of which may include a JDF element path name 600 through 602, respectively, a corresponding PDL command language string 610 through 612, respectively, and a corresponding priority value 620 through 622, respectively.

An exemplary skip table may be encoded in XML, for example, as follows:

```
<JDFSKIP>
    <JDFAttr name="//AgentName" />
    <JDFAttr name="//AgentVersion" />
</JDFSKIP>
```

In the above exemplary skip table, all JDF elements in a JDF job ticket having a path name ending in "Agent" or "AgentVersion"—regardless of where it appears in the JDF hierarchy—are to be ignored.

An exemplary JDF to PJL translation table may be encoded in XML, for example, as follows:

```
<JDF2PJL>
    <Map key="//DigitalPrintingParams/Sides=OneSidedFront"
        value="@PJL SET DUPLEX=OFF"
        priority=1 />
    <Map key="//DigitalPrintingParams/Sides=TwoSidedFlipX"
        value="@PJL SET DUPLEX=ON, @PJL SET
        BINDING=SHORTEDGE"
        priority=1 />
```

-continued

```
<Map key="//DigitalPrintingParams/Sides=TwoSidedFlipX"
    value="@PJL SET DUPLEX=ON, @PJL SET
    BINDING=LONGEDGE"
    priority=1 />
<Map key="//LayoutPreparationParams/Sides=OneSidedFront"
    value="@PJL SET DUPLEX=OFF"
    priority=3 />
<Map key="//LayoutPreparationParams/Sides=TwoSidedFlipX"
    value="@PJL SET DUPLEX=OFF"
    priority=3 />
<Map key="//LayoutPreparationParams/Sides=TwoSidedFlipX"
    value="@PJL SET DUPLEX=OFF"
    priority=3 />
</JDF2PJL>
```

In the above exemplary JDF to PJL translation table, JDF elements in a JDF job ticket referring to the "Sides" parameter encoded within the "DigitalPrintingParams" portion of the JDF hierarchy are translated into corresponding PJL directive to set the "DUPLEX" and "BINDING" parameters. These translation entries have a priority of 1. By contrast, the same "Sides" parameters if specified by a JDF element in a JDF job ticket in the "LayoutPreparationParams" portion of the JDF hierarchy are all translated to turn off the "DUPLEX" PJL parameter. However, these mappings/translations each have a lower priority value of 3. If the "Sides" parameter is specified in a JDF job ticket in the "DigitalPrintingParams" portion of the JDF hierarchy and in the "LayoutPreparationParams" portion of the JDF hierarchy, the lower priority PJL directives (priority=3) will be output first and the higher priority PJL directive will be output last (priority=1). Thus the higher priority values will be the last directive forwarded to the printing system and will thus override the earlier, lower priority PJL directives as regards duplex settings. Those of ordinary skill in the art will readily recognize similar syntax for specifying entries in a JDF to PDL (e.g., Postscript or PCL) table. Further, the above exemplary translation table entries are merely intended as suggestive of a possible syntax in a translation table file to specify translations from a JDF element path name to a command language string with an associated priority value. Numerous specific mappings useful to particular applications of features and aspects hereof will be readily apparent to those of ordinary skill in the art.

Those of ordinary skill in the art will readily recognize that the entries of the various exemplary tables 300, 302, and 304 may be initially populated from the content of a configuration file associated with a particular printer or a particular printing environment. Still further, the table entries may be defined by a manual operator process by creating text files that describe the various entries to be skipped, entries to be translated from JDF to PJL, and entries for JDF elements to be translated into corresponding PDL command language strings. Those of ordinary skill in the art will readily recognize numerous equivalent embodiments including, for example, omission of the skip table, merging of the PJL translation table 302 and the PDL translation table 304, or merging of all the various table entries with addition of suitable flag values to indicate whether an entry is to be skipped, to be used for generating a PJL command language string, or to be used for generating a PDL command language string. Such equivalent and additional structures are omitted herein for simplicity and brevity of this discussion.

Figure 7:
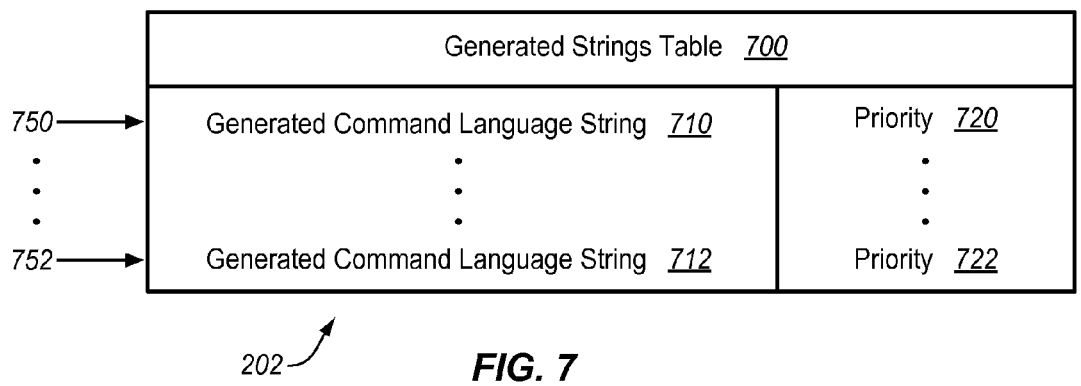
FIG. 7 is a block diagram providing exemplary additional details of features of the generated strings table of FIG. 2.
Figure 8:
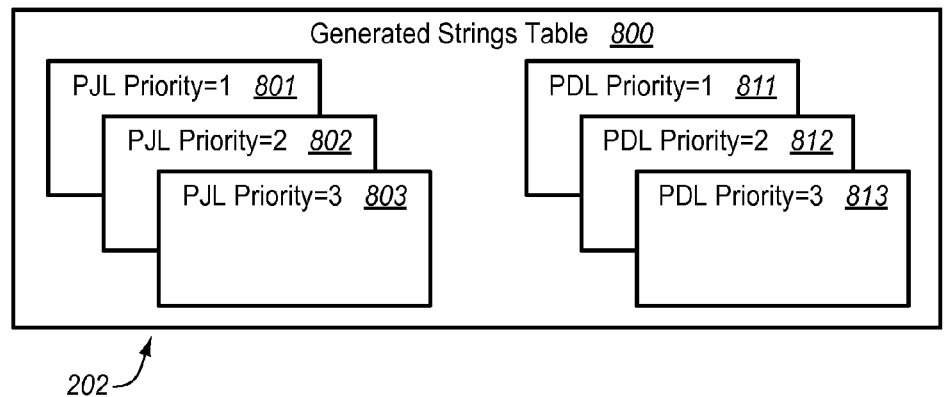
FIG. 8 is a block diagram providing other exemplary additional details of features of the generated strings table of FIG. 2.

FIGS. 7 and 8 provide exemplary additional details of embodiments of memory 202 of FIG. 2 used for storing generated strings and associated priority values for subsequent appending to or merging with other command language strings of the print data in a print job. FIG. 7 shows an exemplary generated strings table 700 including a plurality of entries 750 through 752. Each entry 750 through 752 may store a corresponding generated command language string 710 through 712, respectively and an associated priority value 720 through 722, respectively. Such a table 700 may grow as each received JDF element is processed and any command language strings generated therefrom are added to table 700. Entries 750 through 752 of table 700 may be sorted or otherwise processed in accordance with the priority value 720 through 722 of each entry 750 through 752, respectively.

FIG. 8 provides another exemplary embodiment of tables 800 representing memory 202 for storing generated command language strings. In the exemplary embodiment of FIG. 8, tables 800 may include a plurality of string tables 801, 802, and 803 for storing generated command strings where each table stores strings associated with a corresponding priority value. In other words, PJL command strings having priority value 1 are stored in entries of table 801 while PJL command strings having priority values of 2 or 3 are stored in tables 802 or 803, respectively. In like manner tables 811, 812, and 813 may be used for storing PDL command language strings with each having an associated priority value of 1, 2, or 3, respectively. Those of ordinary skill in the art will readily recognize that any number of priority values may be defined and thus corresponding tables may be provided for each of the utilized priority values. Numerous equivalent data structures will be readily apparent to those of ordinary skill in the art to permit storage of the generated command language strings and their associated priority values so as to permit subsequent output of the generated strings in accordance with an order based on the priority values of each generated string. Such additional and equivalent structures are omitted here for simplicity and brevity of this discussion.

Figure 9:
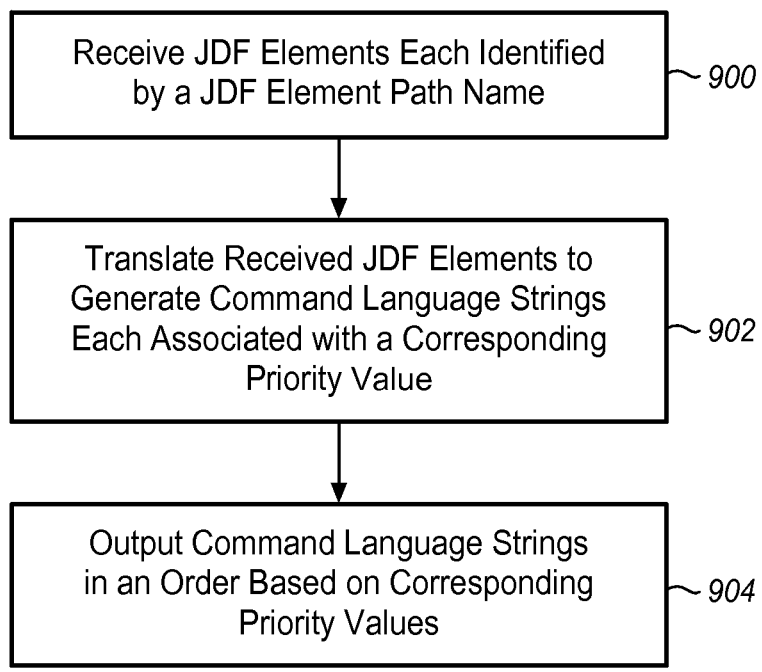
FIG. 9 is a flowchart describing an exemplary method of JDF to command language translations in accordance with features and aspects hereof.

FIG. 9 is a flowchart describing an exemplary method in accordance with features and aspects hereof as may be operable in a system such as system 100 of FIG. 1.

Step 900 receives JDF elements, such as from a JDF job ticket, where each element is identified by a JDF element path name. Such a sequence of JDF elements may comprise a job ticket associated with the print job to be generated and applied to a corresponding printer (and/or spooled for subsequent application to the corresponding printer). Step 902 then translates the received JDF elements to generate corresponding command language strings where each string is associated with a corresponding priority value. Step 904 then outputs the generated command language strings in an order based on the corresponding priority values associated with each generated command language string. Thus the method of FIG. 9 translates JDF elements such as may be provided in a JDF job ticket into corresponding command language strings in an order defined by the priority values so as to most faithfully reflect the intended semantic, hierarchy, and scope of the received JDF elements. Where multiple JDF elements may be specified corresponding to different scope of application to the print job, the priority order in which the generated command language strings are applied to the printer helps assure fidelity with the intent of such multiple JDF elements.

Figure 10:
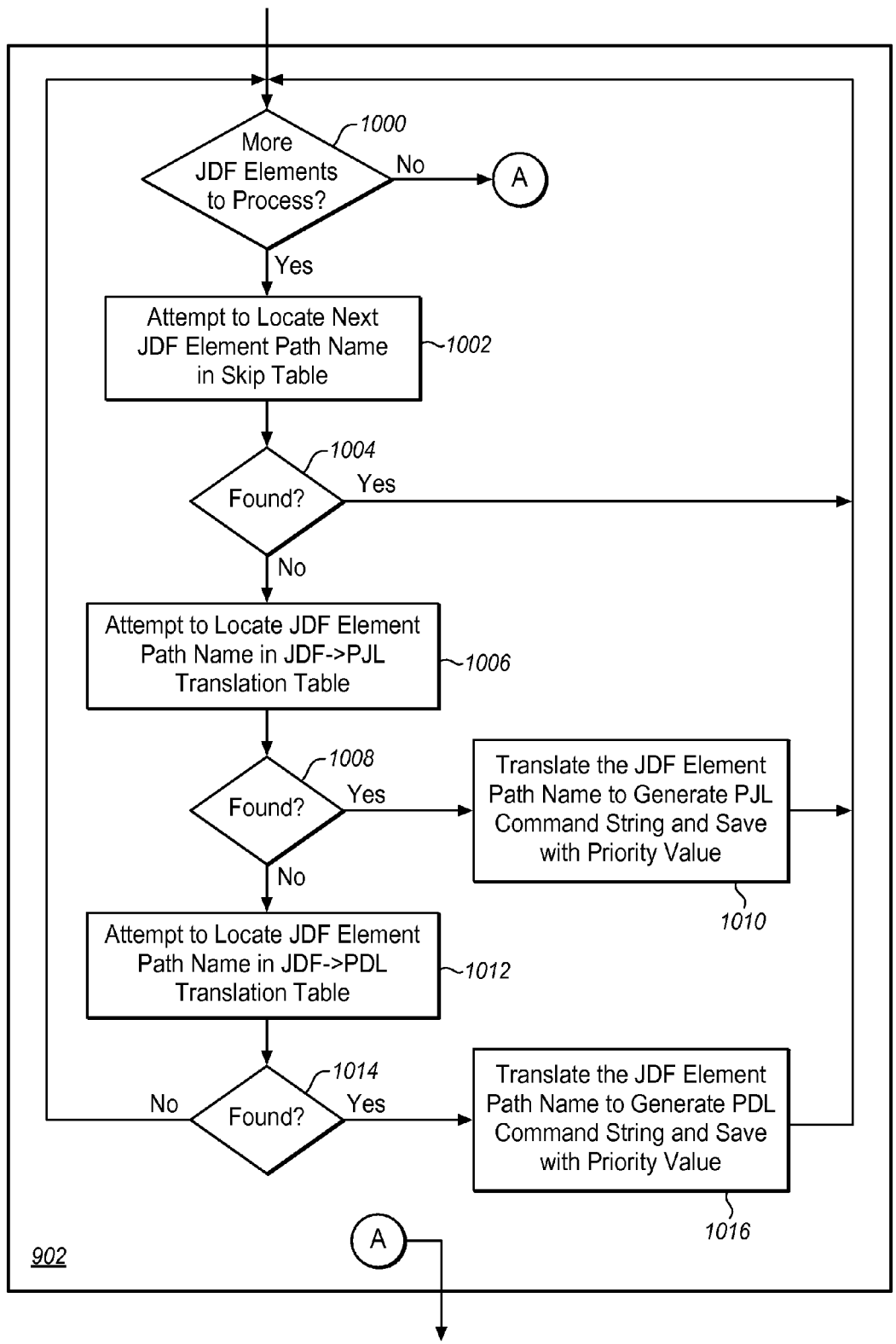
FIG. 10 is a flowchart describing exemplary additional details of a step of FIG. 9 for translating JDF elements into corresponding command language strings.

FIG. 10 is a flowchart providing exemplary additional details of the processing of step 902 of FIG. 9 to generate command language strings by translating received JDF elements. Step 1000 first determines whether more received JDF elements remain to be processed by translation of the method of FIG. 10. If not, processing is complete (label "A") and continues in FIG. 9 as described above. Otherwise, step 1002 attempts to locate the JDF element path name of the next JDF element in a skip table. As noted above, use of a skip table is an optional enhancement and thus processing of step 1002 is also optional. Step 1004 then determines whether the JDF element path name was found in the skip table. If so, processing of this JDF element is complete and the method continues looping back to step 1000 to process further received JDF elements. If the JDF element path name is not found in the skip table, step 1006 attempts to locate the JDF element path name in a JDF to PJL translation table. If the JDF element path name is found in the JDF to PJL translation table as determined by step 1008, step 1010 next translates the current JDF element path name to generate a corresponding PJL command language string (extracting it from the located table entry) and saves the generated command string in a memory with its priority value also determined from fields of the located entry. As noted above in FIGS. 7 and 8, the memory for storing the located string and priority value may utilize any of a variety of equivalent data structures. Processing then continues looping back to step 1000 to continue processing further received JDF elements. If step 1008 determines that the current JDF element path name was not found in the JDF to PJL translation table, step 1012 similarly attempts to locate the current JDF element path name in the JDF to PDL translation table. If step 1014 determines that the current JDF element path name was found in the JDF to PDL translation table, step 1016 translates the JDF element path name to generate a corresponding PDL command language string (extracting it from the located table entry) and saves the generated string with its associated priority value in a suitable memory. As noted above in FIGS. 7 and 8, the memory for storing the located string and priority value may utilize any of a variety of equivalent data structures. If the current JDF element path name was not found in the JDF to PDL translation table as determined by step 1014, processing continues looping back to step 1000. As noted above, in alternative embodiments of the various tables such as where no skip table is provided and/or where one or more of the various translation tables are merged into a single table, those of ordinary skill in the art will readily recognize minor modifications to the method of FIG. 10 to account for such alternatives in the translation table structures.

Figure 11:
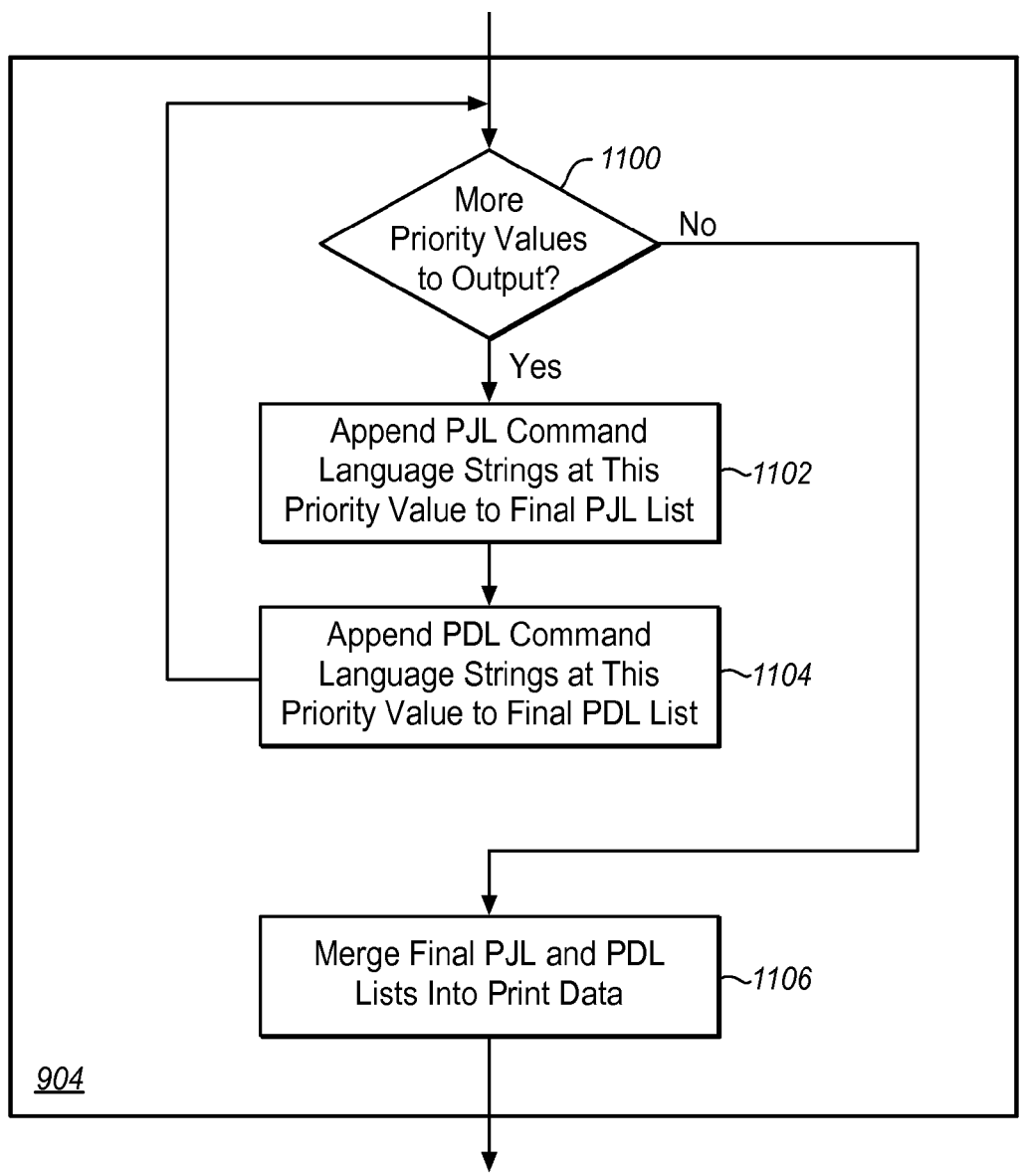
FIG. 11 is a flowchart describing exemplary additional details of a step of FIG. 9 for outputting command language strings in order based on the stored priority values.

FIG. 11 is a flowchart describing exemplary additional details of the processing of step 904 of FIG. 9 to output previously generated and stored command language strings where each command language string is associated with a priority value. As noted above, the generated strings are output to a printer (or spooled for subsequent output to a printer) in an order based on the priority value associated with each generated command language string. Thus steps 1100 through 1104 are iteratively operable for each of the possible priority values utilized in the system. Step 1100 determines whether more priority values remain to be processed to output generated command language strings associated with such priority values. If not, processing of step 904 is complete. Otherwise step 1102 appends generated PJL command language strings associated with this current priority value into a list of PJL strings to be later merged with the print data. Step 1104 then likewise appends generated PDL command strings into a list of PDL strings to be later merged with the print data. Processing then continues looping back to step 1100 to continue processing further priority values. When all priorities have been processed, step 1106 merges the final list of PJL strings and the final list of PDL strings (both in priority order) with appropriate portions of the print data associated with the print job.

Those of ordinary skill in the art will readily recognize other similar or additional method steps for processing the generated command language strings in an order based on the priority values associated with each such generated string.

Figure 12:
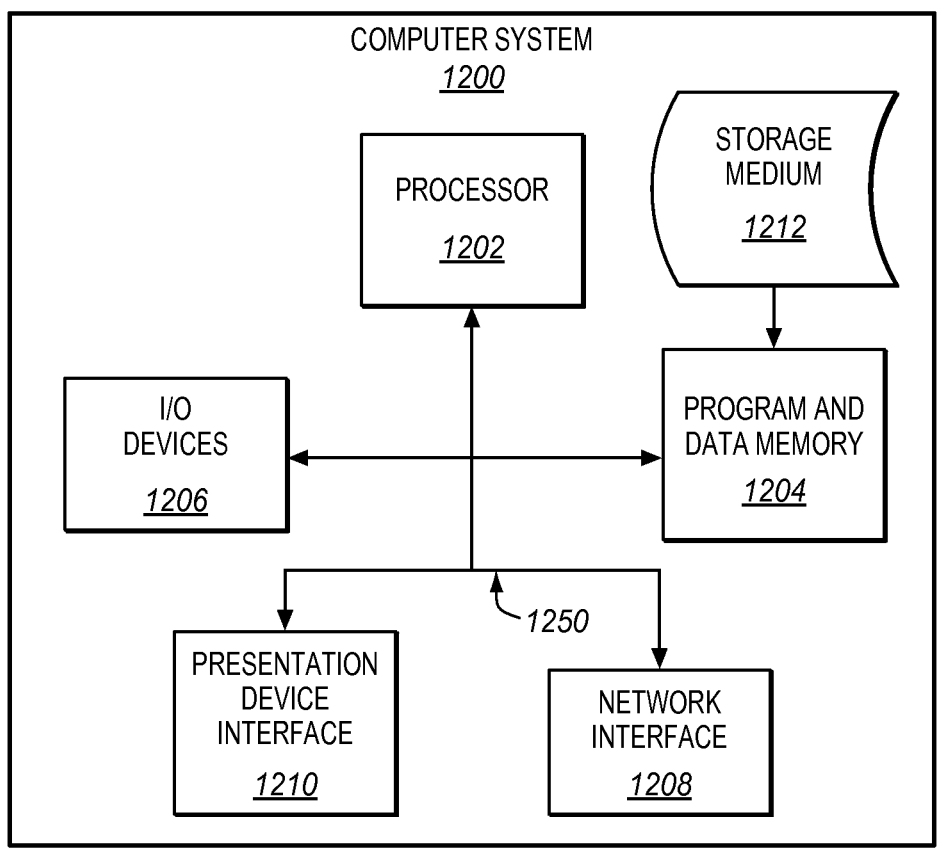
FIG. 12 is a block diagram of an exemplary computer system that may utilize a computer readable medium embodying methods in accordance with features and aspects hereof.

Embodiments of the invention can take the form of an entirely hardware embodiment, an entirely software embodiment or an embodiment containing both hardware and software elements. In one embodiment, the invention is implemented in software, which includes but is not limited to firmware, resident software, microcode, etc. FIG. 12 is a block diagram depicting a computer system 1200 adapted to provide features and aspects hereof by executing programmed instructions and accessing data stored on a computer readable storage medium 1212.

Furthermore, embodiments of the invention can take the form of a computer program product accessible from a computer-usable or computer-readable medium 1212 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A computer system 1200 suitable for storing and/or executing program code will include at least one processor 1202 coupled directly or indirectly to memory elements 1204 through a system bus 1250. The memory elements 1204 can include local memory employed during actual execution of the program code, bulk storage, and cache memories which provide temporary storage of at least some program code in order to reduce the number of times code must be retrieved from bulk storage during execution.

Input/output or I/O devices 1206 (including but not limited to keyboards, displays, pointing devices, etc) can be coupled to the system either directly or through intervening I/O controllers. Network adapter interfaces 1208 may also be coupled to the system to enable the computer system 1200 to become coupled to other data processing systems or storage devices through intervening private or public networks. Modems, cable modems, IBM Channel attachments, SCSI, Fibre Channel, and Ethernet cards are just a few of the currently available types of network or host interface adapters. Presentation device interface 1210 may be coupled to the system to interface to one or more presentation device such as printing systems and displays for presentation of presentation data generated by processor 1202.

Although specific embodiments were described herein, the scope of the invention is not limited to those specific embodiments. The scope of the invention is defined by the following claims and any equivalents thereof.

We claim:

1. A method for translating Job Definition Format (JDF) elements into a command language of a printer, the method comprising:

receiving JDF elements wherein each JDF element is identified by a JDF element path name;

providing a JDF translation table including a plurality of entries each of which associates a JDF element path name with a corresponding command language string and a corresponding priority value;

translating, via a processor, the received JDF elements to generate command language strings wherein each command language string is associated with a corresponding priority value, wherein for each received JDF element translating includes performing the steps of:
locating an entry in the JDF translation table matching the received JDF element path name; and
responsive to locating the entry, saving the command language string and the priority value of the located entry; and
outputting the saved command language strings in an order to a printer based on the saved priority value associated with each saved command language string for processing.

2. The method of claim 1 further comprising:
providing a skip table including a plurality of entries each of which identifies a JDF element path name to be skipped,
wherein the step of translating further comprises:
for each received JDF element performing the steps of:
locating an entry in the skip table matching the received JDF element path name;
responsive to failure to locate a matching entry in the skip table, performing the further steps of:
locating an entry in the JDF translation table matching the received JDF element path name; and
responsive to locating the entry, saving the command language string and the priority value of the located entry.

3. The method of claim 1 further comprising:
creating a plurality of output string tables each associated with a possible priority value that may be associated with a command language output string,
wherein the step of translating further comprises saving said each command language string in the output string table associated with the priority value corresponding to said each command language string,
wherein the step of outputting further comprises outputting the command language strings saved in each of said plurality of output string tables in an order based on the priority value associated with each of the output string tables.

4. The method of claim 1 wherein the command language is one or more of Printer Job Language (PJL), Postscript (PS), and Hewlett Packard Printer Command Language (PCL).

5. The method of claim 1 further comprising:
receiving print data describing a document to be printed,
wherein the step of outputting includes merging the command language strings with the print data and outputting the print data with the merged command language strings.

6. The method of claim 5 wherein the step of merging includes adding a portion of the command language strings to the print data and/or replacing a portion of print data with a portion of the command language strings.

7. A computer system for processing JDF elements associated with printing of print data, the computer system comprising:
a host interface adapted to couple the system to a host system and adapted to receive JDF elements from an attached host system each JDF element identified by a JDF element path name;
a printer interface adapted to couple the system to a printer and adapted to output command language strings to an attached printer;
a translation table including a plurality of entries each entry including a corresponding JDF element path name and a corresponding command language string and each entry associated with a corresponding priority value;
a memory for storing generated command language strings; and
a JDF translator coupled to the host interface and coupled to the printer interface, the JDF translator operable to process received JDF elements to generate command language strings by locating an entry in the translation table having a match for the JDF element path name of a received JDF element, operable to associate a priority value with each command language string, and operable to output the generated command language strings through the printer interface to an attached printer in an order based on the priority values associated with each generated command language string,
wherein the JDF translator is operable to save in the memory the command language string and the priority value corresponding with a located entry, and
wherein the JDF translator is further operable responsive to processing of a last JDF element to output saved command language strings through the printer interface to an attached printer in an order based on the priority values associated with each saved command language string.

8. The system of claim 7 further comprising:
a skip table including a plurality of entries each entry including a corresponding JDF element path name,
wherein the JDF translator is operable to process a received JDF element by locating an entry in the skip table having a match for the JDF element path name of the received JDF element,
wherein, responsive to failure to locate a matching entry in the skip table, the JDF translator is further operable to locate an entry in the translation table having a match for the JDF element path name of the received JDF element in the translation table, and
wherein, responsive to locating a matching entry in the translation table, the JDF translator is further operable to save in the memory the command language string and the priority value corresponding with the located entry.

9. The system of claim 7 wherein:
the JDF translator is operable to output saved command language strings through the printer interface to an attached printer from the memory in an order based on the priority values associated with each saved command language strings.

10. A non-transitory computer readable medium embodying programmed instructions that, when executed by a computer, performs a method for translating Job Definition Format (JDF) elements into a command language of a printer, the method comprising:
receiving JDF elements wherein each JDF element is identified by a JDF element path name;
providing a JDF translation table including a plurality of entries each of which associates a JDF element path name with a corresponding command language string and a corresponding priority value;
translating, via a processor, the received JDF elements to generate command language strings wherein each command language string is associated with a corresponding priority value, wherein for each received JDF element translating includes performing the steps of:
locating an entry in the JDF translation table matching the received JDF element path name; and responsive to locating the entry, saving the command language string and the priority value of the located entry; and outputting the saved command language strings in an order to a printer based on the saved priority value associated with each saved command language string for processing.

11. The computer readable medium of claim 10, the method further comprising:

providing a skip table including a plurality of entries each of which identifies a JDF element path name to be skipped, wherein the step of translating further comprises:

for each received JDF element performing the steps of:

locating an entry in the skip table matching the received JDF element path name;

responsive to failure to locate a matching entry in the skip table, performing the further steps of:

locating an entry in the JDF translation table matching the received JDF element path name; and responsive to locating the entry, saving the command language string and the priority value of the located entry.

12. The computer readable medium of claim 10, the method further comprising:

creating a plurality of output string tables each associated with a possible priority value that may be associated with a command language output string, wherein the step of translating further comprises saving said each command language string in the output string table associated with the priority value corresponding to said each command language string, wherein the step of outputting further comprises outputting the command language strings saved in each of said plurality of output string tables in an order based on the priority value associated with each of the output string tables.

13. The computer readable medium of claim 10 wherein the command language is one or more of Printer Job Language (PJL), Postscript (PS), and Hewlett Packard Printer Command Language (PCL).

14. The computer readable medium of claim 10, the method further comprising:

receiving print data describing a document to be printed, wherein the step of outputting includes merging the command language strings with the print data and outputting the print data with the merged command language strings.

15. The computer readable medium of claim 14 wherein the step of merging includes adding a portion of the command language strings to the print data and/or replacing a portion of print data with a portion of the command language strings.

\* \* \* \* \*